United States Patent [19]

Clough

[11] Patent Number: 4,756,654

[45] Date of Patent: Jul. 12, 1988

[54] FASTENING DEVICE

[75] Inventor: Melvyn J. L. Clough, Acton, Mass.

[73] Assignee: TRW Inc., Solon, Ohio

[21] Appl. No.: 915,894

[22] Filed: Oct. 16, 1986

Related U.S. Application Data

[63] Continuation of Ser. No. 620,763, Jun. 13, 1984, abandoned.

[51] Int. Cl.⁴ ............................................. F16B 37/16
[52] U.S. Cl. ................................. 411/437; 411/429; 411/512
[58] Field of Search ............... 411/182, 429, 431, 436, 411/437, 373, 377, 378, 527, 904, 906, 907, 508–510, 512, 369; 24/108, 662

[56] References Cited

U.S. PATENT DOCUMENTS

| | | | |
|---|---|---|---|
| 1,069,451 | 8/1913 | Marston | 411/437 |
| 1,400,421 | 12/1931 | Colomb | 411/429 X |
| 2,041,202 | 5/1946 | Tinnerman | 85/32 |
| 2,149,719 | 3/1939 | Arnst | 411/437 X |
| 3,203,302 | 8/1965 | Frederick | 411/527 X |
| 3,448,466 | 6/1969 | Haldopoulos | 411/429 |
| 4,188,854 | 2/1980 | Hoehn | 411/437 |
| 4,299,520 | 11/1981 | Iwata | 411/437 |
| 4,358,080 | 11/1982 | Wolker | 248/68 |
| 4,367,995 | 1/1983 | Mizusawa et al. | 411/57 |
| 4,435,111 | 3/1984 | Mizusawa | 411/437 |
| 4,460,298 | 7/1984 | Solarz et al. | 411/15 |
| 4,472,098 | 9/1984 | Kiefer | 411/369 |
| 4,521,148 | 6/1985 | Tanaka | 411/182 |
| 4,570,303 | 2/1986 | Richmond et al. | 411/437 |
| 4,579,493 | 4/1986 | Schaty | 411/437 X |
| 4,600,344 | 7/1986 | Sutenbach et al. | 411/512 |

FOREIGN PATENT DOCUMENTS

| | | | |
|---|---|---|---|
| 729394 | 3/1963 | Canada | 411/433 |
| 1475035 | 4/1969 | Fed. Rep. of Germany | 411/527 |
| 912009 | 7/1946 | France | 411/437 |
| 933050 | 7/1963 | United Kingdom | 411/429 |
| 1477758 | 6/1977 | United Kingdom . | |

OTHER PUBLICATIONS

IBM Technical Disclosure Bulletin, No. 3, Aug. 1977, Push-On Nut, M. Henry.

Primary Examiner—Neill Wilson
Attorney, Agent, or Firm—Fay, Sharpe, Beall, Fagan, Minnich & McKee

[57] ABSTRACT

A molded plastic female fastener component including an aperture having an entrance end for receiving a threaded stud or bolt. Within the aperture are retaining means in the form of an axially spaced series of flexible legs each of which extends about at least a portion of the inner circumference of the aperture to generally define a helical thread form. The legs have a cross-section which tapers from a relatively thick base to a thin outer end inclined in a direction away from the entrance of the aperture. The spacing between adjacent legs in the series is equal to the pitch of the threads of the associated stud. The resilient nature of the shape of the legs allows them to deflect over the threads during an axial "push-on" engagement but to latch under the threads to prevent axial disconnection except by an unthreading operation.

5 Claims, 2 Drawing Sheets

U.S. Patent    Jul. 12, 1988    Sheet 1 of 2    4,756,654

FASTENING DEVICE

This application is a continuation of application Ser. No. 620,763, filed 6/13/84 now abandoned.

BACKGROUND OF THE INVENTION

The present invention is directed toward the art of mechanical fasteners and, more particularly, to an improved fastener component for push-on connection to a threaded stud.

The invention is especially suited for forming fasteners of the type used in the automotive industry for connecting fuel line clamps and various other components to threaded or contoured studs that are welded to the vehicle body or frame. While the invention will be described with reference to its use for the noted purposes, it should be appreciated that the invention is capable of broader applicaton and could be used in a variety of industries for many different purposes.

There has recently been developed a fastening system which has found fairly widespread use in the automotive industry. The system includes a small, male stud member having a threaded or contoured exterior and a mating female component, generally plastic, which can be axially pushed onto the stud member. Typically, the studs are joined to the vehicle frame or body components by a standard stud welding operation.

The desired relationship between the stud and the female member is preferably such that they can be axially pushed together under fairly low force but separated only with substantial reverse axial force or by an unthreading operation like a standard threaded nut.

A variety of different stud thread or exterior contours, as well as many different internal designs for the female component have been proposed in an attempt to provide the desired easy push-on, difficult to separate connection. There has, however, been little success in achieving this desired result. Typically, there has tended to be a direct relationship between the force required to connect components and the force required to separate, i.e., making the components more difficult to separate has generally been achieved only by making them significantly more difficult to join.

Fastener systems of the general type described are shown, for example, in West German Pat. No. 3,002,031. In this patent the female aperture of the connector is provided with longitudinally positioned ribs which protrude radially into the interior. Increasing the size or thickness of the ribs to increase the interference between the ribs and the threaded stud can increase the force required for separation but produces corresponding increases in the force required for axial joining. In addition, there are practical limits that can be achieved with this design since permanent deformation of the ribs and even the exterior of the female connecting component will result at some predetermined level of interference.

The purpose of the subject invention is to provide a fastening component of the type described which can be applied to a threaded or profiled bolt with a comparatively low force axial push, but which can be removed only with the application of substantially greater force or by a normal unthreading operation. In addition, a significant increase in the force required for removal or separation is achieved without any increase in the application force and without permanent deformation of the interior or exterior of the component.

BRIEF DESCRIPTION OF THE INVENTION

According to the subject invention, the interior of the aperture of the female component is provided with at least one axially spaced series of flexible legs each of which extends about at least a portion of the circumference of the interior of the aperture. The legs preferably have a tapered cross-section and are inclined relative to the axis of the aperture in a direction away from the extrance. In addition, the spacing between adjacent legs in the axial direction of the aperture is preferably equal to, or a whole number multiple of, the pitch of the threads of the associated stud.

The resilient nature of the legs together with the noted spacing, allows them to deflect over the threads of the associated stud during axial application. After application, however, the legs engage under the stud threads and attempted axial withdrawal results in a latching engagement between the legs and the threads. The nature of the legs prevents reverse bending and axial removal is prevented by compressive forces being generated between the legs and the stud. Removal by a normal unthreading operation can still be accomplished, however.

In accordance with a more limited aspect of the invention, the legs are of tapered cross-section from a relatively thick base to a comparatively thin, inner end terminating in a flat which lies in a plane generally perpendicular to the axis of the aperture. This shape allows free flexing of the legs during installation but allows them to better resist the compressive forces and crushing which are encountered when a pull-off force is applied.

A still more limited aspect of the invention is the provision of a fastener of the type described which includes means for biasing it in a direction toward the free end of the stud to thereby maintain a slight axial preload between the legs and the stud threads.

BRIEF DESCRIPTION OF THE DRAWINGS

The above and other objects and advantages will become apparent from the following description when read in conjunction with the accompanying drawings wherein.

DETAILED DESCRIPTION OF A PREFERRED EMBODIMENT

Referring more particularly to the drawings wherein the showings are for the purpose of illustrating a preferred embodiment of the invention only, and not for the purpose of limiting same, FIGS. 1 through 4 show a molded plastic female fastener component 10 comprising a hex shaped body 12 having an upper closed end 14 provided with a transverse slot 16. The hex shaped body 12 and the slot 16 form no part of the invention but allow the use of a wrench or screwdriver for removing the fastener after it has been installed in a manner subsequently to be described.

Figure 1:
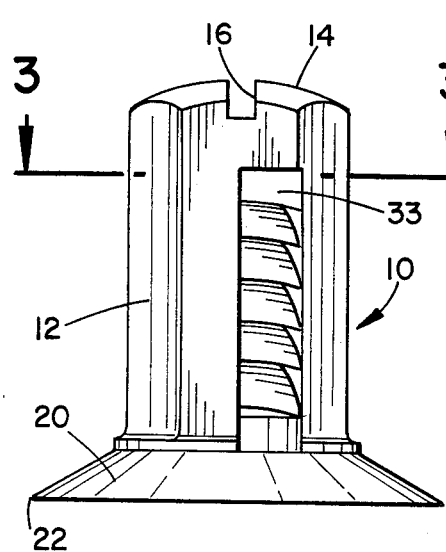
FIG. 1 is a side view of a fastener formed in accordance with a preferred embodiment of the invention.
Figure 2:
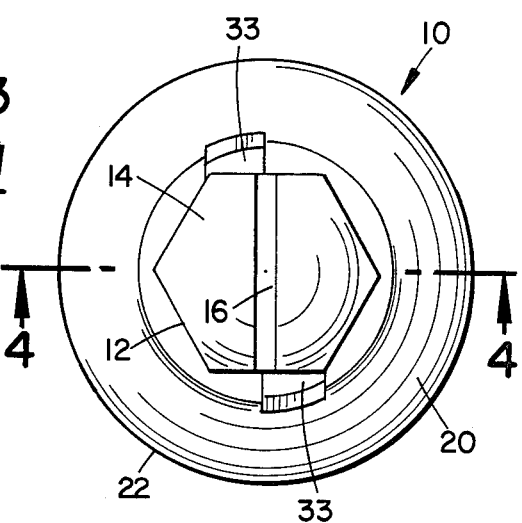
FIG. 2 is a top view of the fastener shown in FIG. 1.
Figure 4:
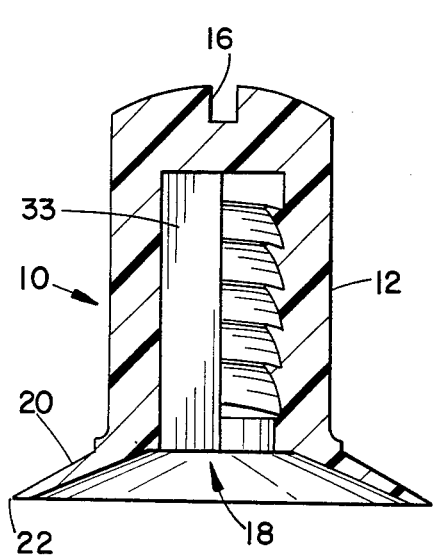
FIG. 4 is a cross-sectional view taken on line 4—4 of FIG. 2.
Figure 3:
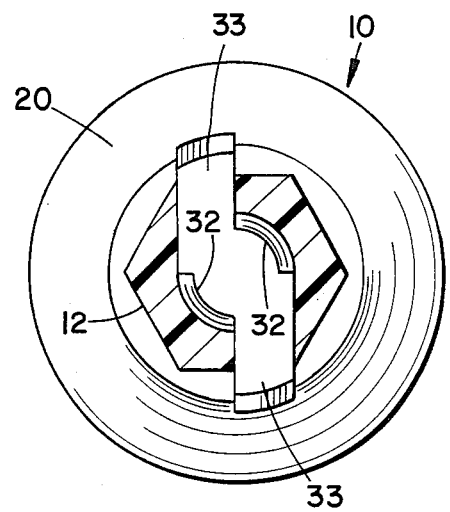
FIG. 3 is a cross-sectional view taken on line 3—3 of FIG. 1.

As best shown in FIGS. 3 and 4, the lower end of body 12 includes an axially inwardly extending aperture 18. A flange or skirt portion 20 extends generally radially from body 12 about the entrance end of aperture 18. Skirt portion 20 is preferably relatively resilient and has a downwardly inclined, tapered cross-section as shown in FIG. 2. The peripheral edge 22 of skirt portion 20 is comparatively thin and lies in a single plane spaced outwardly from the entrance to aperture 18 and perpendicular to the axis thereof.

As mentioned earlier, fastener components of this general type are widely used, for example, in the automotive industry in conjunction with threaded studs or bolts that have been stud welded to the vehicle frame or body. The fasteners are designed so that they can be axially pushed onto the studs but, ideally, removed only by unthreading. Many different types of longitudinally extending ribs or fins have been proposed for the interior portion of the female component in an attempt to achieve the desired relationship. These prior art approaches have not been particularly successful. The subject invention, however, provides an improved design for the interior of the female component which overcomes the noted problems. The design allows the component to be installed with a low force, axial push. Removal, on the other hand, can be accomplished only by unthreading or with the application of an extremely large axial force.

Figure 5:
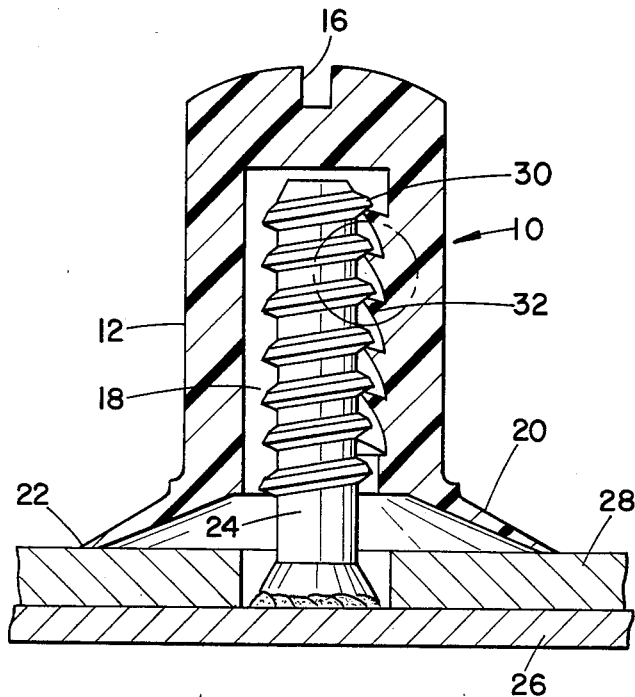
FIG. 5 is a cross-sectional view similar to FIG. 4 but showing the fastener assembled with a threaded stud.
Figures 6, 7:
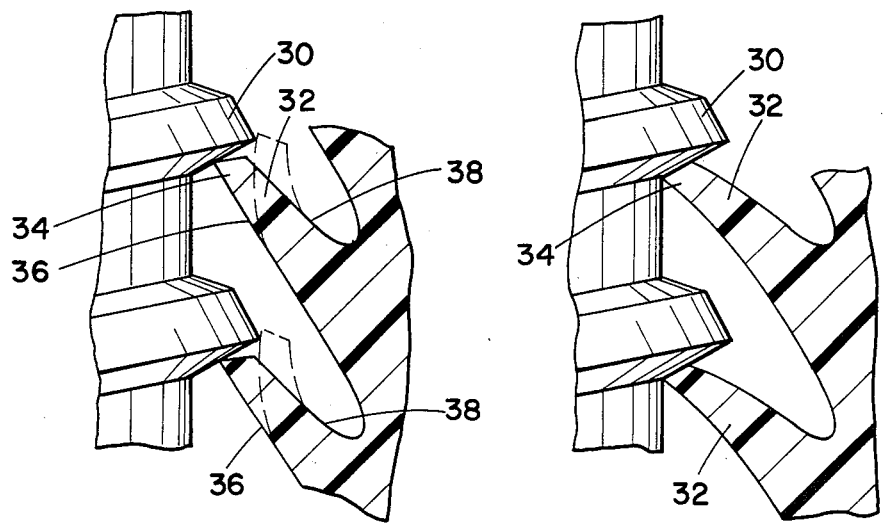
FIG. 6 is an enlarged view of the circled area of FIG. 5 showing the relationship between the fastener and the stud in the normal installed but unloaded position; and, FIG. 7 is a view similar to FIG. 6 but shows the relationship between the fastener and the stud upon application of an axial force tending to separate them.

The preferred form of the inventive design can best be seen, and its operation understood, by reference to FIGS. 5 through 7. Specifically, FIG. 5 shows the fastener 10 assembled on a threaded or contoured metal stud 24. Stud 24 is shown joined by a conventional stud welding operation to a subjacent metal frame member 26. A separate part or component 28 is held or connected to member 26 by the cooperation of fastener 10 and stud 24.

Stud 24 is illustrated as having a buttress-like, helical spiral thread form 30. This thread form is well known in the art and is shown and described, for example, in published Japanese Utility Model Application 56-42516 of Sept. 9, 1980. This thread form has been illustrated as typical. It does not, however, form any particular part of the invention and the invention could be used with a variety of other thread forms.

Of importance to the invention is the arrangement of the internal legs or fins 32. The legs 32 are formed integrally with the body 12 and extend into the aperture 18 generally radially but with their outer free ends 34 directed away from the entrance toward the inner or closed end of aperture 18. While the legs could be continuous about the interior of the aperture 18, as shown in FIG. 3, they are desirably formed in two diametrically opposed series of legs 32 each having a circumferencial extent of approximately 90°. The circumferential extent of the legs 32 is determined by a pair of vertical openings or windows 33 (see FIGS. 1 through 4) which extend through body 12 into aperture 18.

The legs in each series are shown spaced apart a distance substantially equal to the pitch of the threads of the associated stud. In addition, the legs have a helical layout which corresponds to the helix of the stud threads. As can be appreciated, the circumferential extent of the legs 32 could vary from that shown. Also, the number and spacing of the legs could, of course, vary.

The preferred shape of legs 32 is best illustrated in FIG. 6. As shown, each leg 32 includes side surfaces 36 and 38 which extend from the inner wall of aperture 18. The surfaces 36 and 38 are inclined from the wall of aperture 18 such that the legs 32 are inclined toward the inner end of the aperture and have a relative thick base portion 40 tapering to a relatively thin free end portion 34. While the actual angles can vary, surfaces 36 preferably form an angle in the range of 30° relative to the axis of aperture 18 and surfaces 38 lie at an angle in the range of 45°.

The shape of the legs together with their flexibility in at least the direction of their incline allow the connector member 10 to be applied to the stud 24 by a low force axial push. As shown by dotted lines in FIG. 6, the legs deflect resiliently to pass over the crests of threads 30. As the fastener 10 is completely moved onto the stud 24, the resilient skirt 20 engages member 28. Further movement causes deflection of the skirt 20 which produces an upward bias on the fastener and, thus, biases the free ends 34 of the legs 32 against the underside of threads 30 (as viewed in FIG. 6). This produces a firm, vibration resistant engagement between the fastener and the stud.

While the fastener 10 can be removed from the stud 24 by an unthreading operation, attempts to remove it by application of an axial force are strongly resisted. Referring to FIG. 7, for example, a force applied to the fastening tending to move the fastener in the direction of the arrow causes the free ends 34 of the legs 32 to cam into the root of thread 30. This produces a latching effect between the stud and the legs of the fastener. The shape of the legs and their free ends is such that applying additional axial pull-off force acts to attempt to compress the legs rather than reverse bend them. By virtue of this invention push-on application forces are comparatively low while pull-off forces are extremely high.

While the invention has been described in conjunction with its use in a cap-type nut, it should be appreciated that the invention is capable of broader application. For example, the fastener can be formed as an integral part of other components such as fuel line clamps, housings or the like.

Having thus described my invention, I claim:

1. A fastener component for connection to a helically threaded male connecting member, said component comprising:
    (a) a molded plastic body having a wall defining a generally cylindrical aperture having an entrance end opening to the exterior of said body for axiallly receiving said male connecting member;
    (b) first and second diametrically opposed and longitudinally extending series of a multiplicity of axially spaced independently flexible leg members formed integrally with said body, each of said leg members in each series being spaced from the next adjacent leg member a distance equal to the pitch of said helically threaded male connecting member and having a tapered cross-section with a relatively thick base and a relatively thin free end and extending about at least a portion of the circumference of the interior of the aperture in a helical path corresponding to the helical threads on the male connecting member;

(c) each of said leg members being defined by a pair of surfaces inclined at angles in the range of 30 to 45 degrees in a first direction away from the entrance to said aperture and being resiliently deflectable independently of said wall in said first direction but resisting deflection in a second direction opposite said first direction; and, (d) wherein each of said leg members further have a generally transversely extending flat on their free ends and a length such that their free ends substantially reach the roots of the threads of said male connecting member such that upon attempted axial withdrawal of said connecting member said leg members latch into said roots and axial withdrawal can be effected only by permanently deforming said leg members.

2. The fastener component of claim 1 wherein each said first and said second series have a circumferential extend of less than 180°.

3. The fastener component of claim 2 including openings extending into said body and intersecting said aperture, said openings having a longitudinal extend at least as great as the longitudinal extent of each of said series of leg members.

4. The fastener component of claim 3 wherein there are a pair of said openings located on diametrically opposite sides of said aperture intermediate said first and said second series of leg members.

5. The fastener component of claim 1 including a resilient skirt member formed about said entrance end opening of said aperture and having an outer end lying in a plane perpendicular to the axis of said aperture.

* * * * *